United States Patent
Amodei et al.

[11] 3,915,549
[45] Oct. 28, 1975

[54] CRYSTALS FOR RECORDING PHASE HOLOGRAMS

[75] Inventors: Juan Jose Amodei, Langhorne, Pa.; William Phillips, Princeton, N.J.

[73] Assignee: RCA Corporation, New York, N.Y.

[22] Filed: Apr. 24, 1974

[21] Appl. No.: 463,607

Related U.S. Application Data

[63] Continuation of Ser. No. 196,733, Nov. 8, 1971, abandoned, which is a continuation-in-part of Ser. No. 168,902, Aug. 4, 1971, abandoned.

[52] U.S. Cl. .................................................. 350/3.5
[51] Int. Cl.² ........................................... G03H 1/02
[58] Field of Search.. 350/3.5; 340/173 LT, 173 LS, 340/173 LM, 173 CC

[56] References Cited
UNITED STATES PATENTS
3,544,189  12/1970  Chen et al. ........................... 350/3.5
3,703,328  11/1972  Glass et al. ........................... 350/3.5

OTHER PUBLICATIONS
Amodei et al., *Applied Physics Letters*, Vol. 18, No. 11, June 1, 1971 pp. 507–509.
Peterson et al., *Applied Physics Letters*, Vol. 19, No. 5, Sept. 1, 1971, pp. 130–132.

*Primary Examiner*—Ronald J. Stern
*Attorney, Agent, or Firm*—Glenn H. Bruestle; Birgit E. Morris

[57] ABSTRACT

Single crystal electro-optic material useful for recording phase holograms consists of lithium niobate doped with iron or manganese or lithium tantalate doped with iron. These crystals may also contain other dopants together with the iron or manganese.

2 Claims, 6 Drawing Figures

INVENTORS.
JUAN JOSE AMODEI &
WILLIAM PHILLIPS
BY
ATTORNEY

OPTICAL ABSORPTION OF A 0.5 CM SAMPLE OF LiNbO$_3$ CONTAINING 0.1 m/o Mn, FOR LIGHT POLARIZED PARALLEL (∥) AND PERPENDICULAR (⊥) TO THE C-AXIS

CRYSTALS FOR RECORDING PHASE HOLOGRAMS

This is a continuation of application Ser. No. 196,733, filed Nov. 8, 1971, now abandoned, which in turn is a continuation-in-part of application Ser. No. 168,902, filed Aug. 4, 1971, now abandoned.

BACKGROUND OF THE INVENTION

This invention relates to single crystal electrooptic materials useful for recording phase holograms and particularly to doped lithium niobate crystals.

The invention herein described was made in the course of or under contract with the Department of the Navy.

For practical use of the electro-optic crystals for the recording of phase holograms, it is desirable to employ a crystal having higher sensitivity and diffraction efficiencies as compared with prior art materials. One of the materials that has been used for recording phase holograms is undoped lithium niobate. While this material has a fairly good sensitivity and diffraction efficiency as compared with other electro-optic materials suitable for recording phase holograms, it is still desired to further improve these characteristics. We have discovered that specific dopings of lithium niobate and lithium tantalate lead to crystals having an improved sensitivity of as much as 500 to 1 and improved diffraction efficiency of as much as 10 to 1 or more as compared to undoped lithium niobate or lithium tantalate.

SUMMARY OF THE INVENTION

A crystal useful for recording phase holograms comprises crystalline materials selected from the group consisting of lithium tantalate and lithium niobate, said crystalline materials being doped with a member of the group selected from iron and manganese.

DETAILED DESCRIPTION OF THE INVENTION

Generally, recording of phase holograms in thick electro-optic crystals consists of generating an interference pattern through the interaction between a coherent reference beam and an object beam. The object beam carries the spatial modulation corresponding to the image to be recorded. The light pattern formed by the interference of the object beam and the reference beam causes a change in the index of refraction of the electro-optic medium. The refraction pattern thereby produced is a three-dimensional pattern which is representative of the object. Coherent readout light traversing the electro-optic medium in the direction of the reference beam is phase modulated in accordance with the recorded refractive index pattern, thereby reproducing the object beam through wavefront reconstruction.

Figure 1:
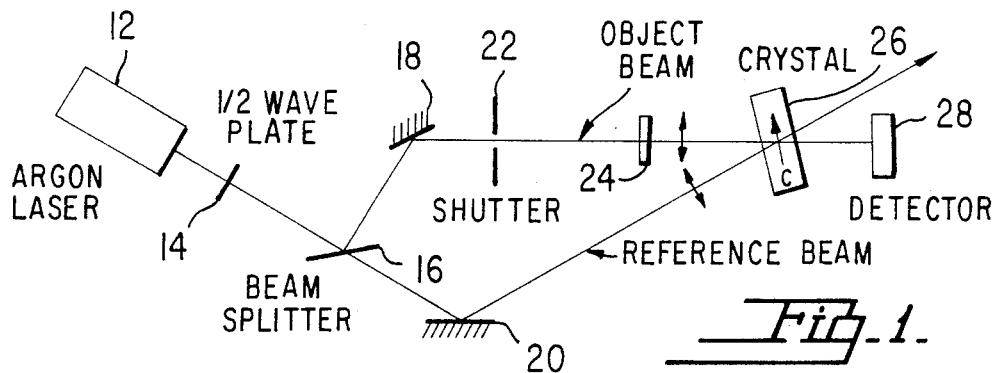
FIG. 1 is a schematic diagram of a system useful for recording and reading holographic information in an electro-optic crystal and for testing the sensitivity and diffraction efficiency of the electro-optic crystal.

Referring to FIG. 1, there is shown schematically a system useful for recording and reading holographic information in an electro-optic crystal. The system comprises an argon laser 12 which emits coherent light of a wavelength of 4,880A. This light passes through a one-half wave plate 14 to obtain coherent light which is horizontally polarized. The light then passes through a beam splitter 16. A portion of this radiation is reflected from the beam splitter onto a first mirror 18 and the other portion of the radiation passes through the beam splitter onto a second mirror 20. The mirrors 18 and 20 are adjusted such that the plane polarized beams reflected from them meet at an angle of 30°. The portion of the beam which is reflected from the beam splitter is termed the object beam and after being reflected from the mirror 18 passes through a shutter 22 and then through the object 24. The portion of the beam which passes through the beam splitter 16 is termed the reference beam. The reference beam and object beam intersect to form the interference pattern. The electro-optic crystal 26 is positioned at the intersection of the reference beam and the object beam, with the crystallographic c axis perpendicular to the bisector of the 30° angle between the reference and object beam. When the electro-optic crystal is iron doped $LiNbO_3$, the argon laser having an emission of 4,880A is particularly suitable for recording the holographic information on the crystal, although longer wavelengths can also be used. The crystals are cut and polished with parallel faces containing the c axis. The polarization direction of the object and reference beams is horizontal, i.e., in the plane of the incidence, as is the c axis of the crystal.

The recorded holographic pattern is read out by closing the shutter, thereby blocking the object beam and allowing only the reference beam to impinge on the crystal. An image of the object will thereby be formed and may be viewed either spatially or alternatively on a detector 28 such as a silicon solar cell or an image screen.

In order to improve the sensitivity and diffraction efficiency of lithium niobate, the crystal must be doped or otherwise treated so as to increase the number of electrons able to participate in optically excited charge transfer. Whether or not such optically excited charge transfer will, in fact, occur with a particular dopant, generally cannot be predicted in advance. For example, lithium niobate crystals doped with chromium, cobalt, nickel and molybdenum showed essentially no change in sensitivity or diffraction efficiency as compared with undoped lithium niobate. Doping of lithium niobate with manganese showed a small improvement in sensitivity and diffraction efficiency, while in the case of iron doped lithium niobate, the writing sensitivity was increased by as much as a factor of 500 as compared with undoped crystals, while the diffraction efficiency was improved by a factor of about 10 to 1.

The term diffraction efficiency is defined as the ratio of the intensity of the diffracted beam to that of the incident reference beam, taking reflection into account. The diffraction efficiency was determined by measuring the ratio of the power density at the center of the diffracted beam to the transmitted power density at the center of the reference beam. This fractional percentage is called relative diffraction efficiency and, when modified to take into account the power losses due to absorption within the sample and reflective losses, it gives the true diffraction efficiency. The term, sensitivity or writing sensitivity, is measured by the power density of incident light required to achieve a diffraction efficiency of 40%.

The novel doped lithium niobate crystals which are suitable as holographic recording elements may be prepared by Czochralski crystal growth technique. This is a typical procedure but any other crystal growth procedure may be used. The crystals may be grown either from a nonstoichiometric melt or alternatively from a stoichiometric melt. There is little difference in the hologram recording properties of iron doped crystals grown from a nonstoichiometric melt as compared with a stoichiometric melt. The crystals may be doped either during growth or by a diffusion technique subsequent to growth.

A typical procedure for preparing iron doped lithium niobate crystals is as follows: the starting materials are Grade I lithium carbonate and niobium pentoxide (United Mineral and Chemical Company). About one mole of each of these materials are mixed intimately and added a little at a time to a 100-cc platinum crucible. After each addition, the crucible is heated in a resistance furnace until the materials react and fuse. In this manner, the crucible is eventually filled to about 80% of its capacity. Iron in the form of iron oxide ($Fe_2O_3$) is added during the final stages of filling. The filled crucible is placed in a resistance-heated growing furnace. A slow flow of oxygen is maintained in the furnace throughout warmup, growth, annealing, and cooldown of the crystals. The melt is brought to a temperature of approximately 1260°C, where growth is initiated on a c axis oriented seed crystal. (Other seed orientations may also be used.) The crystal is pulled from the melt at a rate which is typically about 5mm per hour. It is preferred to rotate the crystal while it is being pulled. Rotation rates of 12 to 30 rpm may be employed. Crystals are grown in this manner to a diameter of from 10 to 15mm. Regulation of the melt temperature is accomplished with a thermocouple immersed directly in the melt, touching the inside of the crucible and connected to an electronic temperature regulator. Another thermocouple, sheathed in platinum, is used that continuously records the temperature. An electric current of 5 to 10 mA is sometimes maintained from the seed to the melt throughout the entire growth by means of a high impedance power supply. This current is applied in order to pole the crystals.

Typically, crystal growth is terminated after 2.5 to 3 cm of growth, whereupon the crucible is then lowered into a well in the bottom of the furnace. The grown crystal is then lowered into the center part of the furnace where it is annealed in a nearly isothermal environment. Typical annealing parameters are 1100°C for 4 to 5 hours. Following the annealing, the crystal is cooled to room temperature at about 50°C per hour.

When the above procedure is followed, there is no tendency for the crystals to crack. The grown crystal may be mounted and sliced lengthwise with a diamond saw so as to obtain optical samples therefrom.

An alternative method for doping lithium niobate with iron or manganese is to evaporate a film of the metal on the undoped crystals and to heat treat the crystals containing the metal film thereon so as to cause diffusion of the metal into the crystals. For example, a 20-mil-thick wafer of lithium niobate may be doped with iron by evaporating a 500A to 2500A thick iron film thereon and heat treating the crystals with the film at 1200°C for about 16 hours in an inert atmosphere such as argon. It is found that crystals doped in this manner as compared with doping during crystal growth possess a faster erase time for erasure light of a given power density. Therefore, while crystals which are doped during crystal growth are more suitable for applications which do not require rapid updating of holographic information, the diffusion doped crystals are more suitable for those applications which do require rapid updating of holographic information.

In addition to iron doping, the novel material may also include other dopants. For example, lithium niobate may be doped with both iron and molybdenum.

It is believed that the ionic species that produces both the optical absorption spectrum (FIG. 2) and the enhanced holographic sensitivity and diffraction efficiency of iron doped lithium niobate is divalent iron, while the enhancement in manganese doped crystal is believed to be due to pentavalent manganese. Because of the fact that these properties are due to a particular ionic species, the amount of doping of the lithium niobate crystals with iron or manganese is generally specified nominally since the amount of the ionic species will vary depending upon the conditions of growth, annealing, and post-heat treatment of the crystal. By nominal doping we mean the quantity of iron, generally in mole %, added to the crucible during crystal growth. The actual amount of iron in the crystal is some fraction of the nominal quantity, usually about 50% thereof.

The intensity of the optical absorption, the holographic sensitivity and the diffraction efficiency of a crystal with a given iron doping level can be controlled by subjecting the crystal to heat treatment in oxidizing or reducing atmospheres. For example, the absorption of a heavily iron-doped crystal can be reduced by annealing it in oxygen (typically 850°C for several hours), and the absorption intensity of a lightly iron-doped sample can be increased by annealing it in hydrogen, a hydrogen-inert gas mixture, or in an inert gas. Crystals having as little as 10 ppm iron, as determined by emission spectrographic analysis, show the enhanced storage effect due to iron doping. Alternatively, crystals measured by the same procedure to contain 1000 ppm or more of iron also work well. If the amount of coloration of these crystals is excessive, it can be decreased by oxidation. The amount of iron that must be incorporated in the melt from which the crystals are grown to achieve dopings in this range (nominal doping) depend upon the crystal growth conditions. Typically, the range of nominal doping is from 0.01 mole percent Fe to 0.25 mole percent Fe. A preferred range of nominal doping is from 0.05 to 0.1 mole percent of iron. The same doping ranges also apply to manganese.

Figure 2:
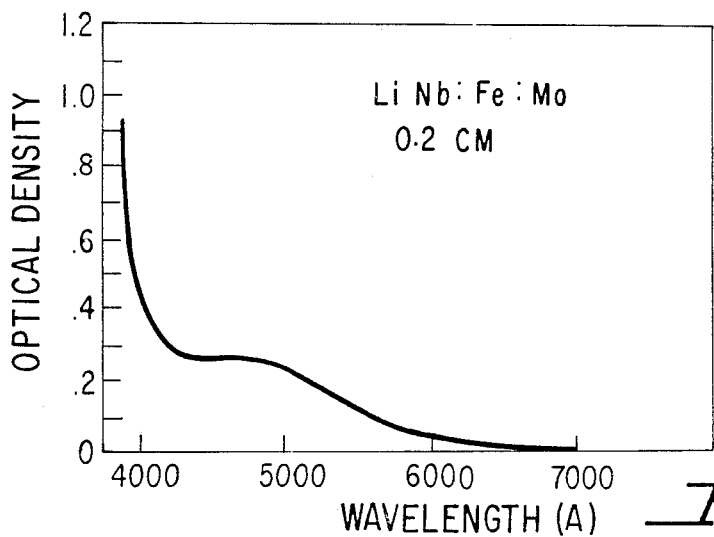
FIG. 2 is a graph showing the optical absorption spectrum of an iron doped lithium niobate crystal.
Figure 3:
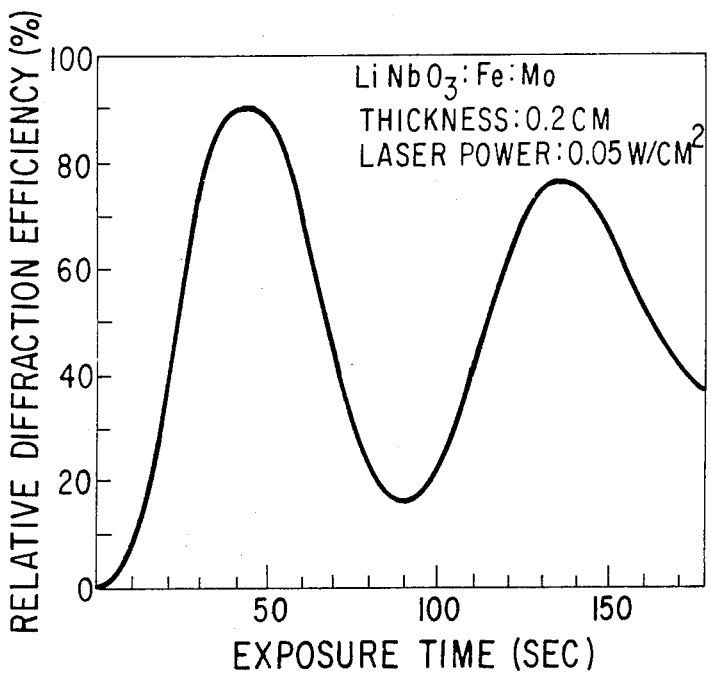
FIG. 3 is a graph plotting the relative diffraction efficiency in percent as a function of exposure time of incident radiation of an iron doped lithium niobate crystal.

FIG. 2 indicates the optical density for unpolarized light of a 2-mm sample nominally doped with 0.1 mole percent iron. The doping causes significant optical absorption at the writing wavelength 4,880A. The unexpectedly high sensitivity of this sample for holographic storage applications is illustrated by the curve in FIG. 3 which was recorded with a laser power density of 0.05 W/cm$^2$. The relative diffraction efficiency of this sample goes through several maxima with continued exposure. The incident energy density required to reach 40% diffraction efficiency in this sample is less than 1 Joule/cm$^2$. This represents an improvement of about 3 orders of magnitude as compared with undoped and untreated lithium niobate.

Figure 4:
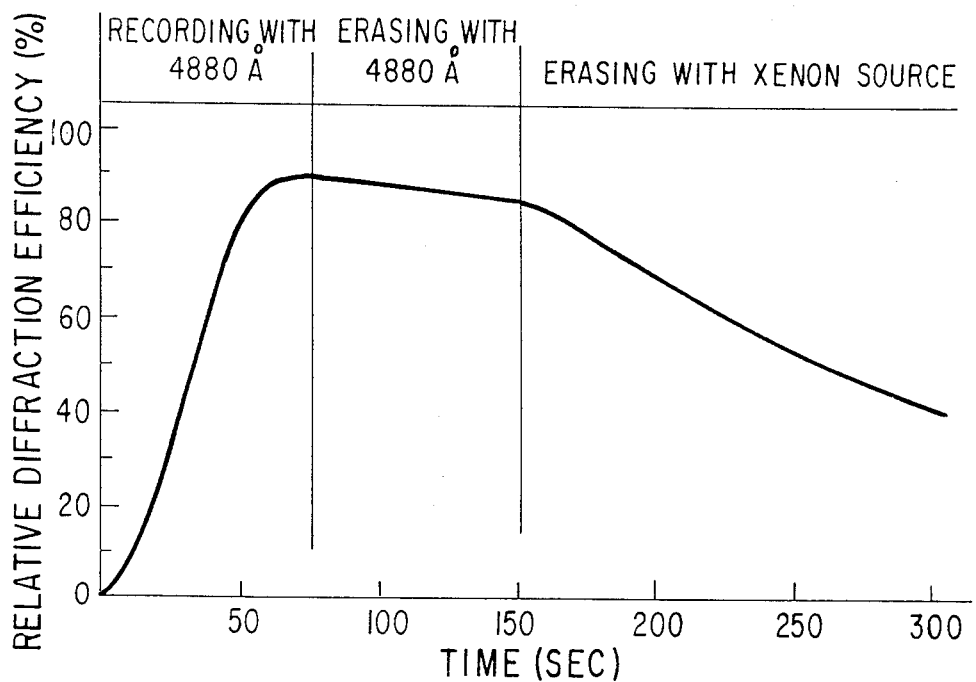
FIG. 4 is a plot of relative diffraction efficiency as a function of time of an iron doped lithium niobate crystal illuminated with light from different sources and demonstrates the improved erasure resistance of a hologram in the crystal.
Figure 5:
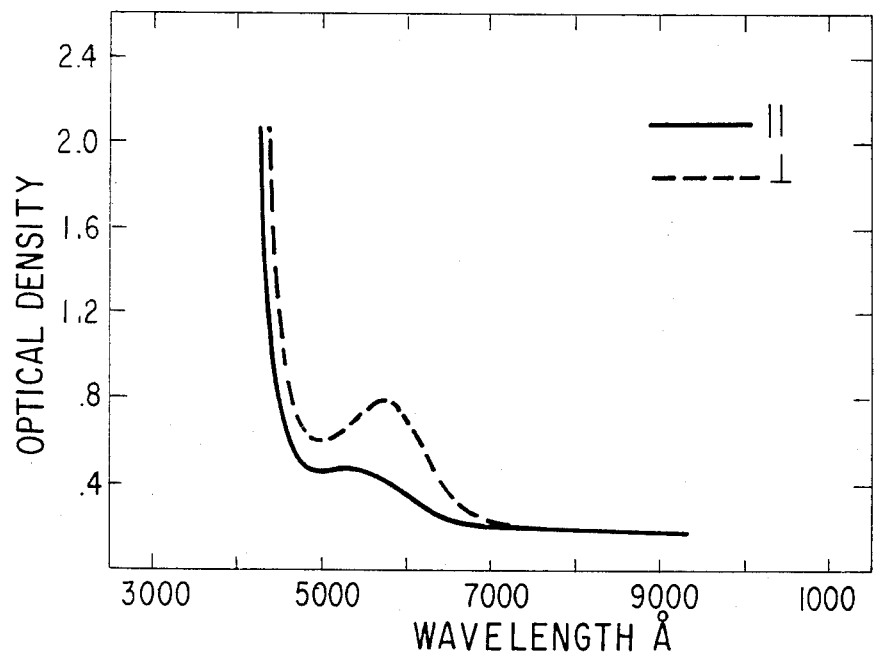
FIG. 5 shows the optical absorption of a manganese doped lithium niobate crystal and light polarized parallel to and perpendicular to the c axis of the crystal.

In iron doped crystals wherein doping was accomplished during crystal growth, the erasure process is much slower than the recording process. This is highly desirable behavior for applications which require some storage of the holographic pattern. The contrast between writing and erasure sensitivity to the 4,880A argon wavelength, and erasure rate when illuminated with a high power unfiltered xenon source, is shown in FIG. 4. The argon beam power during erasure was about one-half that during recording.

In iron doped lithium niobate crystals wherein the iron was diffused into the already grown crystal, one observes the same large improvements in sensitivity as compared with crystals which were doped during growth. However, in crystals wherein the iron is diffused into the crystal subsequent to crystal growth, the sensitivity of recording and erasure are essentially equal. In applications requiring rapid updating of material, the diffusion iron doped crystals are preferred.

Figure 6:
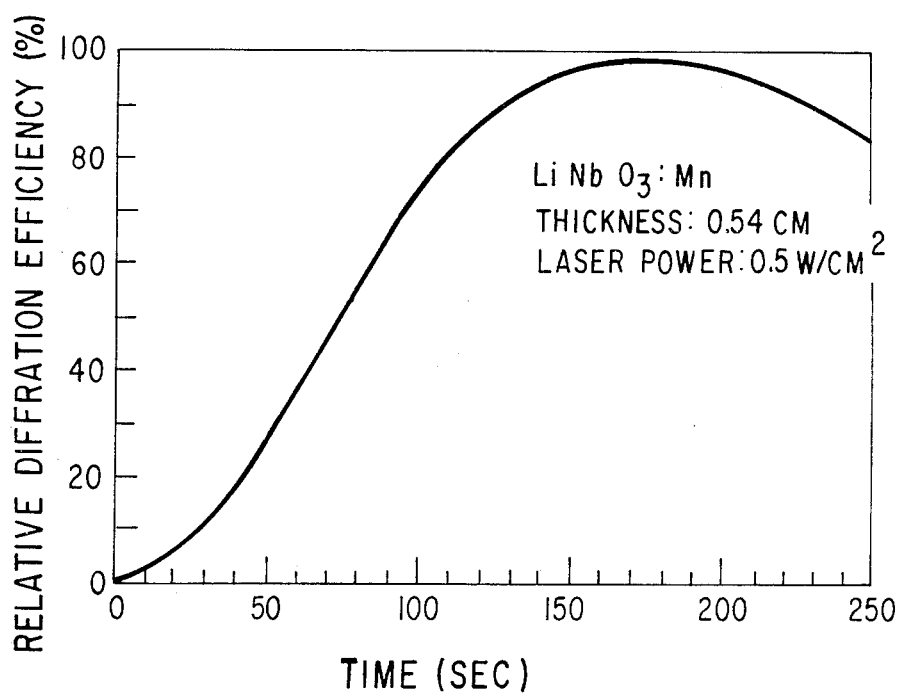
FIG. 6 is a graph plotting the relative diffraction efficiency in percent as a function of exposure in a manganese doped lithium niobate crystal.

In addition to iron, only manganese doping was observed to improve the sensitivity and diffraction efficiency of lithium niobate as compared with undoped crystals. The magnitude of this improvement, however, is significantly lower than that with iron doping. FIG. 6 shows the storage of a high efficiency hologram in a sample doped with 0.1 mole percent of manganese. The efficiency is shown to approach 100% and then to decrease, as observed in the iron doped samples. However, the manganese doped samples have a much lower sensitivity than either irradiated samples or the iron doped samples. For example, the energy density required to obtain a 40% diffraction efficiency in a manganese doped sample is about 30 Joule/cm$^2$ as compared with about 1 Joule/cm$^2$ in iron doped samples.

As previously indicated, crystalline lithium tantalate (LiTaO$_2$) doped with iron also provides an improved holographic recording media. The iron doped lithium tantalate can be prepared from Czochralski grown lithium tantalate crystals by first evaporating a layer of metallic iron on the crystal in a thickness of about 1000A and then heating the crystal in an inert atmosphere such as argon at approximately 1200°C for 72 hours, thus permitting the iron to diffuse into the lithium tantalate crystal.

Crystals doped in the aforementioned manner were compared to undoped crystals and to undoped crystals that were subjected to heat at 1200°C in argon for 72 hours but without the iron coating. The comparison made on 40 mil thick samples shows that the iron doped material has at least 100 times more sensitivity than undoped crystals (i.e., the rate at which holograms are written for a given light intensity is at least 100 times faster in the doped material). Also, the maximum diffraction efficiency achieved in the doped crystal is approximately 40 times higher than that achieved in the undoped crystal.

What is claimed is:

1. In a system for recording phase holograms comprising a laser, means for forming an object beam and a reference beam and means for recording the interference diffraction pattern formed by combining said object beam and said reference beam wherein said recording means comprises crystalline lithium niobate doped with from about 0.0001 to about 0.25 mol percent of the lithium niobate of iron.

2. The system recited in claim 1 wherein said iron is present in said crystal in a concentration of from 10 to 1000 ppm.

* * * * *